(12) United States Patent
Funari

(10) Patent No.: US 7,481,413 B2
(45) Date of Patent: Jan. 27, 2009

(54) FLUSH ACTUATOR ASSEMBLY AND METHOD THEREFOR

(75) Inventor: Michael A. Funari, Apex, NC (US)

(73) Assignee: Zurn Industries, LLC, Erie, PA (US)

( * ) Notice: Subject to any disclaimer, the term of this patent is extended or adjusted under 35 U.S.C. 154(b) by 0 days.

(21) Appl. No.: 11/151,692

(22) Filed: Jun. 13, 2005

(65) Prior Publication Data
US 2006/0033060 A1 Feb. 16, 2006

Related U.S. Application Data

(60) Provisional application No. 60/579,398, filed on Jun. 14, 2004.

(51) Int. Cl.
F16K 31/385 (2006.01)

(52) U.S. Cl. .......................... 251/40; 251/229; 251/339

(58) Field of Classification Search ................ 251/40, 251/339, 229, 234
See application file for complete search history.

(56) References Cited

U.S. PATENT DOCUMENTS

| | | | |
|---|---|---|---|
| 1,912,937 A * | 6/1933 | George .................. | 251/40 |
| 2,038,135 A * | 4/1936 | Sloan ..................... | 251/40 |
| 2,612,187 A * | 9/1952 | Romanelli et al. ....... | 251/40 |
| 2,858,846 A | 11/1958 | Parker | |
| 3,207,467 A | 9/1965 | Bühler | |
| 4,134,570 A * | 1/1979 | Walker .................. | 251/40 |
| 4,272,052 A | 6/1981 | Gidner | |
| 4,327,891 A | 5/1982 | Allen et al. | |
| 4,893,645 A | 1/1990 | Augustinas et al. | |
| 5,062,453 A | 11/1991 | Saadi et al. | |
| 5,244,179 A | 9/1993 | Wilson | |
| 5,365,978 A * | 11/1994 | Woods ................ | 137/614.11 |
| 5,431,181 A | 7/1995 | Saadi et al. | |
| 5,497,802 A | 3/1996 | Whiteside | |
| 5,505,427 A * | 4/1996 | Whiteside ............. | 251/40 |
| 5,535,781 A | 7/1996 | Paterson et al. | |
| 5,730,415 A | 3/1998 | Gronwick | |
| 6,056,261 A | 5/2000 | Aparicio et al. | |
| 6,189,554 B1 | 2/2001 | Pino | |
| 6,227,219 B1 | 5/2001 | Pino | |
| 6,554,018 B1 | 4/2003 | Pino | |
| 2002/0047102 A1 | 4/2002 | Hankin et al. | |
| 2003/0089867 A1 | 5/2003 | Hall et al. | |

* cited by examiner

*Primary Examiner*—John Rivell
*Assistant Examiner*—Cloud K Lee
(74) *Attorney, Agent, or Firm*—The Webb Law Firm

(57) ABSTRACT

A flush actuator assembly is adapted to fit existing valve bodies. The flush actuator assembly includes a plunger rod which is capable of displacing the relief valve post more or less to adjust the flow of water through the flush valve during a single flush. The relief valve post may be displaced different amounts by adjusting the actuator assembly such that the plunger rod contacts the relief valve post at different locations along the central longitudinal axis of the post. Additionally, the relief valve post may be displaced different amounts by providing a plunger rod that has a different range of travel. A method associated with displacing the relief valve post varying amounts is also disclosed.

16 Claims, 4 Drawing Sheets

FLUSH ACTUATOR ASSEMBLY AND METHOD THEREFOR

CROSS-REFERENCE TO RELATED APPLICATION

This application claims the benefit of U.S. Provisional Application Ser. No. 60/579,398 filed Jun. 14, 2004, which is herein incorporated by reference in its entirety.

BACKGROUND OF THE INVENTION

1. Field of the Invention

The present invention relates in general to a flush valve for urinals and other plumbing equipment and, more particularly, to a flush actuator assembly utilized on a flush valve.

2. Description of Related Art

Flush valves in water closets, urinals and other plumbing devices which utilize a flexible diaphragm to establish and to seal off the connection between the inlet and outlet are well known in the art. FIG. 1 illustrates a typical prior art flush valve 5. The flush valve 5 has a valve body 10, generally made of brass, which includes an inlet 12 and outlet 14 and an actuator connection 16. A barrel section 18 is positioned within the flush valve 5 such that the connection between the inlet 12 and the outlet 14 is through the barrel section 18. A valve seat 20 is formed on a top or sealing end 21 of the barrel section 18. The valve seat 20 is normally closed by a diaphragm or movable sealing arrangement 22 extending across the body 10 and defining an upper chamber 24. The diaphragm 22 has a by-pass 26 which provides fluid communication between the inlet 12 of the flush valve 5 and the upper chamber 24. The diaphragm 22 is attached at its outer edge to the valve body 10 and is clamped in place by an annular clamping rim 27 on an upper cover 11 of the body 10. The diaphragm 22 has a central opening 23 which allows for fluid communication between the upper chamber 24 and the outlet 14. A relief valve 28 normally closes the central opening 23 of the diaphragm 22.

The operation of the flush valve 5 is generally as follows. In the normally closed position shown in FIG. 1, water pressure in the valve inlet 12 is communicated to the upper chamber 24 through the by-pass 26 defined in the diaphragm 22. Because the surface area which is subjected to water pressure is greater on the upper side of the diaphragm 22, the water pressure forces the diaphragm 22 down onto the sealing end 21 of the barrel section 18 (i.e., valve seat 20), thus preventing water from flowing to the outlet 14. A flush actuator assembly 30 is attached to the valve body through the actuator connection 16 and moves a plunger rod 32 inwardly which contacts and displaces a relief valve post 40 of the relief valve 28 which then displaces from the valve seat 20 a valve seat seal 42 connected to the post 40. The actuator connection 16 may be a nut 17 with a threaded portion 17a mated with a threaded portion 10a of the body 10. wherein the nut 17 has a shoulder 17b which captures and urges the flush actuator assembly 30 against the body 10.

This releases the pressure in the upper chamber 24 by allowing water to flow through the central opening 23 of the diaphragm 22 to the outlet 14. After the diaphragm 22 and the relief valve 28 move upwardly, the relief valve 28 resets itself thereby causing the valve seat seal 42 to cover the valve seat 20, thereby closing off the upper chamber 24 except for the passageway provided by the by-pass 26. Water then flows then flow through the by-pass 26 into the upper chamber 24 until the diaphragm 22 is again forced against the valve seat 20, thereby closing the valve. The flush actuator assembly 30 includes a drive mechanism such as a handle 44 or another device capable of displacing the plunger rod 32 against the relief valve post 40, including a motor or solenoid well known to those skilled in the art of flush valve designs.

With a focus on water conservation, valve designers are now exploring modifications to flush valves to more closely adjust and control the quantity of water passing through the flush valve for each flush.

Therefore, it is desirable to provide a mechanism capable of adjusting and controlling the quantity of water through a flush valve for each individual flush.

SUMMARY OF THE INVENTION

In one embodiment, a flush actuator assembly for use with a flush valve comprises a base having a bore extending therethrough, wherein the bore has a central longitudinal axis. The assembly also has a plunger rod having a central longitudinal axis, wherein the plunger rod is positioned within and guided by the bore of the base. A drive mechanism moves the plunger rod back and forth within the bore, and the bore central longitudinal axis is offset from the plunger rod central longitudinal axis.

In another embodiment, a flush valve includes such a flush actuator assembly.

Yet another embodiment of the subject invention is directed to a method of adjusting the fluid flow through a flush valve by providing a valve body with an inlet and an outlet, a valve seat formed in the body between the inlet and outlet, and a flexible diaphragm above the valve seat defining a lower chamber in fluid communication with the inlet and an upper chamber, wherein in a closed position the diaphragm is urged against and seals the valve seat and wherein in an open position the diaphragm is relaxed and spaced from the valve seat such that the inlet is in fluid communication with the outlet. The valve further has a diaphragm bypass between the upper and lower chambers, whereby fluid from the inlet passes into the upper chamber and pressurizes the upper chamber to urge the diaphragm into the closed position. A relief valve relieves pressure from the upper chamber, thereby allowing the diaphragm to displace from the valve seat to provide fluid communication between the inlet and the outlet. The relief valve is comprised of a valve seat seal and a post extending therefrom. A plunger rod having a central longitudinal axis is positioned within and guided by the bore of the base and the plunger rod is positioned adjacent and transverse to the relief valve post. The relief valve post is displaced varying amounts to open the relief valve to varying degrees thereby permitting more or less water to flow through the valve during a flush cycle.

DETAILED DESCRIPTION OF THE INVENTION

Figure 1:
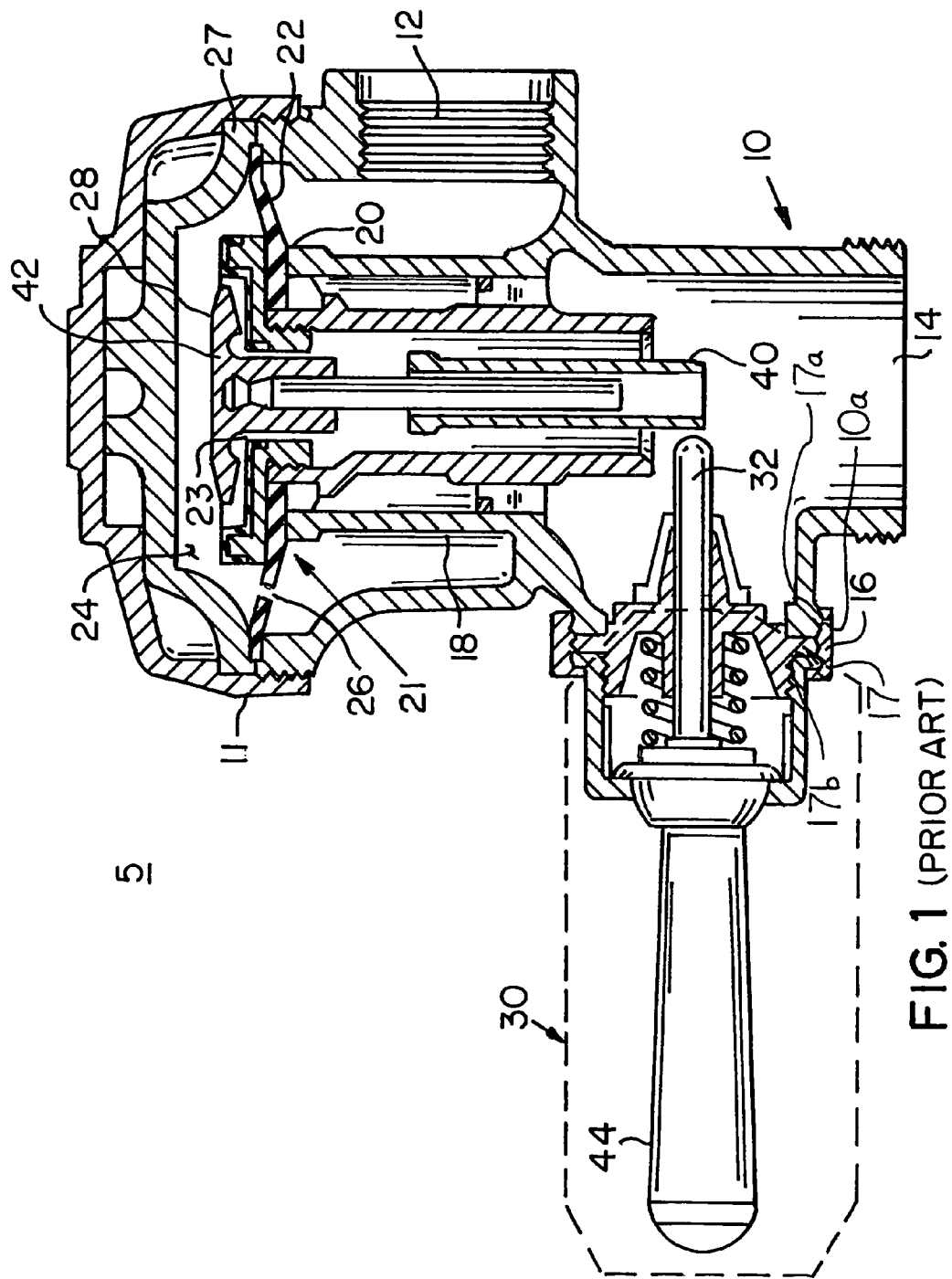
FIG. 1 is a partial sectional view of a prior art flush valve with a flush actuator assembly.

It has long been known that the flush duration of a flush valve is directly affected by the length of time in which the relief valve within the flush valve is open. Some prior art flush valve designs have included an adjustable screw in the cap of the flush valve body which protrudes through the body and limits the distance the relief valve seal of the relief valve may separate from the valve seat. However, directing attention to FIG. 1, it has been discovered that the position the plunger rod 32 contacts the relief valve post 40 along the length of the post 40 determines how far the valve seat seal 42 separates from the valve seat 20. In particular, and directing attention to FIG. 2A, when the plunger rod 32 moves to the right a distance of X, the relief valve post 40 is laterally displaced and the valve seat seal 42 pivots upon the valve seat 20 such that a portion of the valve seat seal 42 continues to contact the valve seat 20 while an opposing portion of the valve seat seal 42 pivots away from the valve seat 20 to create a gap Y. Directing attention to FIG. 3A, given the identical relief valve post 40 having a valve seat seal 42 which rests upon the valve seat 20 and, furthermore, a plunger rod 32 designed to travel to the right a distance X against the relief valve post 40, if the point of contact of the plunger rod 32 is higher up along the relief valve post 40, then the valve seat seal 42 on the side opposite the pivot will separate from the valve seat 20 to create a gap of Y+Δ, wherein Δ is the additional separation produced by moving the position of plunger rod 32 further up along the relief valve post 40. As will be discussed further, the plunger rod 32 may be mounted in an eccentric fashion such that the flush actuator assembly 30 may be selectively adjusted on the flush valve body 10 to determine, within a range, the vertical position at which the plunger rod 32 will contact the relief valve post 40.

Figure 3A:
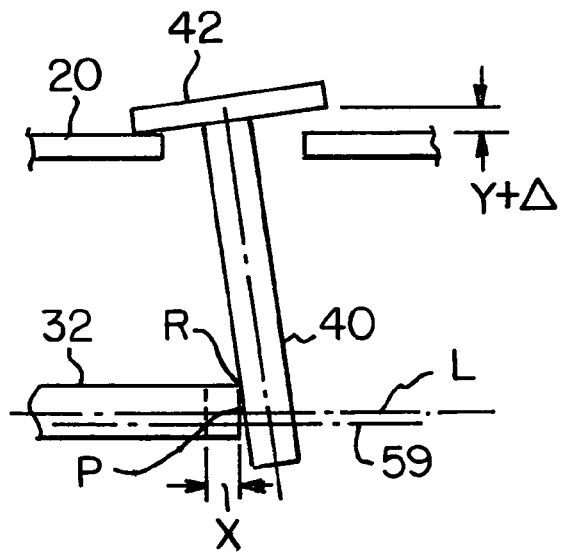
FIG. 3A is a schematic drawing illustrating the displacement of the relief valve with the plunger rod oriented in a second position.
Figure 4A:
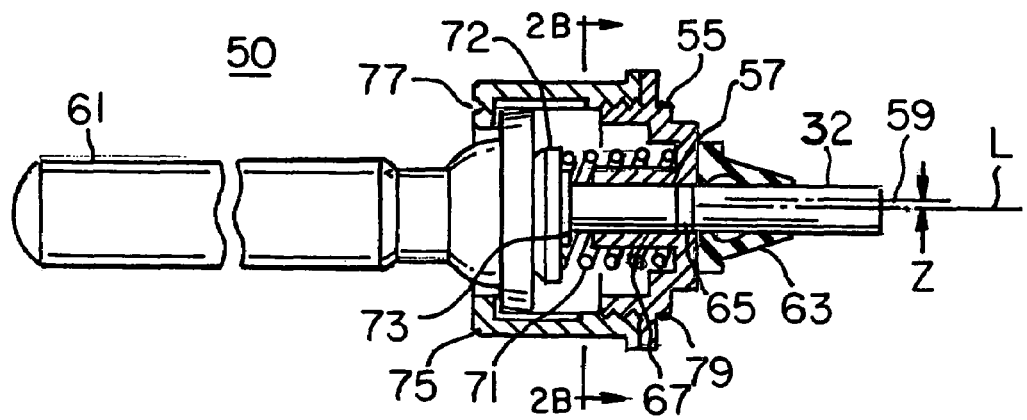
FIG. 4A is a sectional view of a flush actuator assembly in accordance with the subject invention.

Directing attention to FIG. 4A, a flush actuator assembly 50, for use with a flush valve, is comprised of a base 55 having a bore 57 extending therethrough, wherein the bore 57 has a central longitudinal axis 59. The plunger rod 32 has a central longitudinal axis L and the plunger rod 32 is positioned within and guided by the bore 57 of the base 55. The assembly 50 furthermore has a drive mechanism for moving the plunger rod 32 back and forth within the bore 57. One such drive mechanism may be a flush handle 61. Of particular importance in this design is the fact that the axis 59 of the bore 57 is offset from the central longitudinal axis L of the plunger rod 32 by a distance Z. By offsetting the plunger rod 32 within the base 55, the base 55 may be rotated such that the vertical position along the relief valve post 40 (FIGS. 2A and 3A) at which the plunger rod 32 contacts the relief valve post 40 may be varied and, as a result, the separation distance Y between the valve seat seal 42 and the valve seat 20 may be adjusted. The plunger rod 32 can be made of metal or a polymeric material such as plastic.

The flush actuator assembly 50 illustrated in FIG. 4A may be interchangeable with the prior art flush actuator 30 illustrated in FIG. 1. Each flush actuator assembly 30, 50 is secured to the body 10 by an actuator connection 16, such as the nut 17 threadably mated with the body 10. Furthermore, the flush actuator assembly 50 may be easily adapted to mount upon any number of commercial flush valve and provide the same benefit in adjusting the flow of water through the valve during a flush.

A typical flush actuator assembly 30 (FIG. 1) is secured to an actuator connection 16 extending through the valve body 10 and, as a result, the flush actuator assembly 30 acts to seal water within the valve body 19. Directing attention to the flush valve assembly 50 illustrated in FIG. 4A, a sealing sleeve 63 made of a resilient material, such as a thermoplastic elastomer, is attached to the base 55 and fits over the plunge rod 32 to provide a fluid seal. Additionally, an O-ring 65 is located within a recess 67 about the plunger rod 32 within the bore 57 of the base 55 to further prevent water from leaving the valve body 10 through the flush actuator assembly 50. The flush actuator assembly 50 illustrated in FIG. 4A is a relatively standard part but, as mentioned, the plunger rod 32 of the flush actuator assembly 50 has a central longitudinal axis L passing therethrough; the plunger rod is offset by an amount Z from the central longitudinal axis 59 of the bore 57 extending through the base 55. As a result, the flush actuator assembly 50 may be mounted to the body 10 of the flush valve 5 so that the offset Z may be oriented in any desired direction by rotating the assembly 50 within the valve body 10.

Figure 2A:
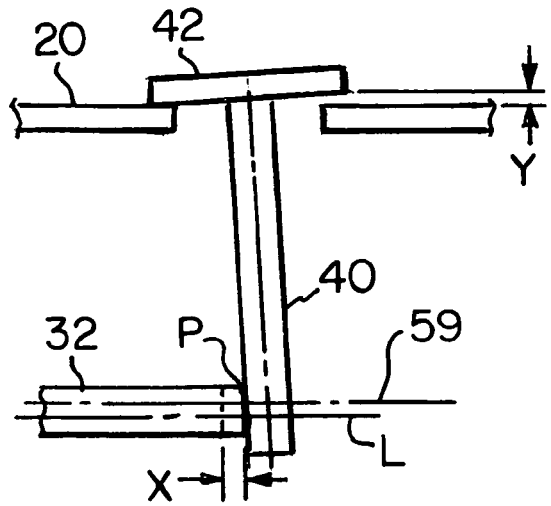
FIG. 2A is a schematic drawing illustrating the displacement of the relief valve with the plunger rod oriented in one position.
Figure 2B:
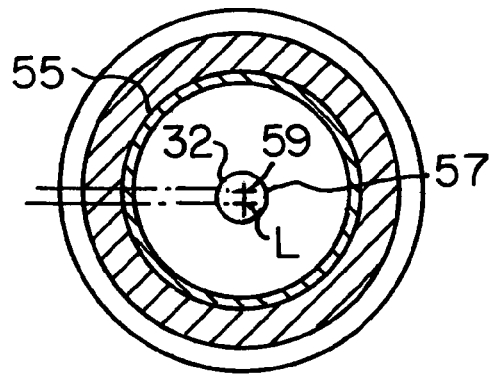
FIG. 2B is an end view of the valve base with the plunger rod positioned therein and viewed along arrows "2B-2B" in FIG. 4.
Figure 3B:
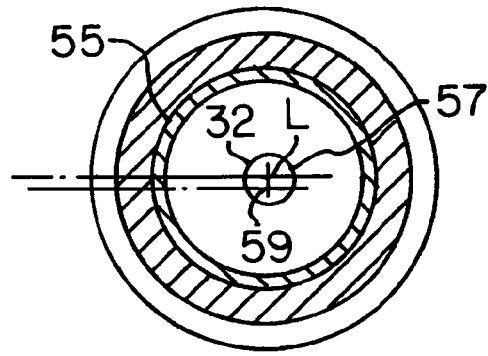
FIG. 3B is an end view of the valve base with the plunger rod positioned therein and similar to the view of FIG. 2B but rotated 180 degrees.

For example, briefly directing attention to FIGS. 2A-2B and 3A-3B, FIGS. 2A and 3A are sketches of the relief valve post 40 displaced to differing degrees by the plunger rod 32. FIG. 2B is a cross-sectional view along lines "2B-2B" of FIG. 4A showing the relative location of the plunger rod 32 within the base 55. In FIG. 2B, the base 55 has a bore 57 with a central longitudinal axis 59, while the plunger rod 32 has a central longitudinal axis L which contacts the relief valve post 40 at point P (FIG. 2A). The central longitudinal axis L of the plunger rod 32 is below the central longitudinal axis 59 of the bore 57. FIG. 3B is a cross-sectional view similar to FIG. 2B but the base 55 is now rotated 180° such that the central longitudinal axis L of the plunger rod 32 is above the central longitudinal axis 59 of the bore 57 extending through the base 55. As a result the plunger rod 32 contacts the relief valve post 40 at a point R above point P. It can be appreciated that the base 55 may be rotated less than 180°, thereby providing intermediate results to those found in FIGS. 2A and 3A.

Figure 4B:
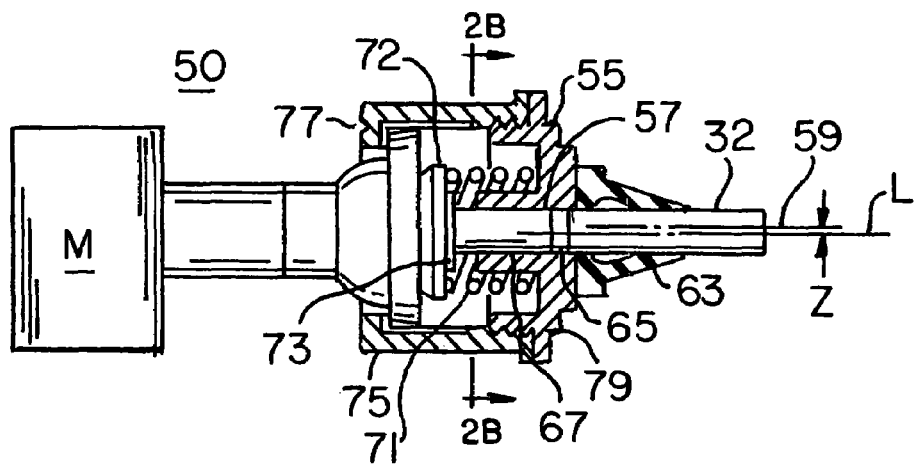
FIG. 4B is a sectional view of the flush actuator assembly shown in FIG. 4A having a different drive mechanism.

Returning to FIG. 4A, the flush actuator assembly 50 for moving the plunger rod 32 may be a flush handle 61 mounted to the base 55 which, when moved, displaces the plunger rod 32 within the base bore 57. As previously mentioned, in lieu of the flush handle 61 for moving the plunger rod 32, FIG. 4B shows a motor M such as a solenoid operating upon and physically displacing the plunger rods 32 in the same fashion as the handle 61 may be used. A motor operating on the flush handle 61 (not shown) may also be used.

Figure 7:
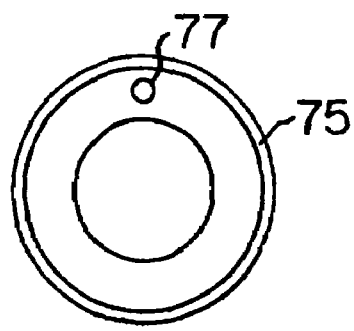
FIG. 7 is an end view of the other casing of the flush valve actuator marked to identify the orientation of the plunger rod.

The flush actuator assembly 50 further includes a spring 71 between the base 55 and a first end 73 of the plunger rod 32 to bias the plunger rod 32 in a retracted position. The spring 71 acts against a plunger rod head 72 at the first end 73 of the plunger rod 32. The flush actuator assembly 50 further includes an outer casing 75 marked to identify the offset orientation of the plunger rod 32 within the base 55. In FIG. 4A, a notch 77 is imparted to the outer casing 75 to identify the orientation of the base 55. FIG. 7 furthermore illustrates such a notch 77 in the outer casing 75 of the flush actuator assembly 50.

As illustrated in FIG. 4A, the body 55 includes an end portion 79 that is threaded to be compatible with matching threads (not shown) on the actuator connection 16 (FIG. 1) of the valve body 10. In the alternative, the base 55 may include an end portion 79 adapted to snap within the actuator connection 16 in the valve body 10.

Figure 5:
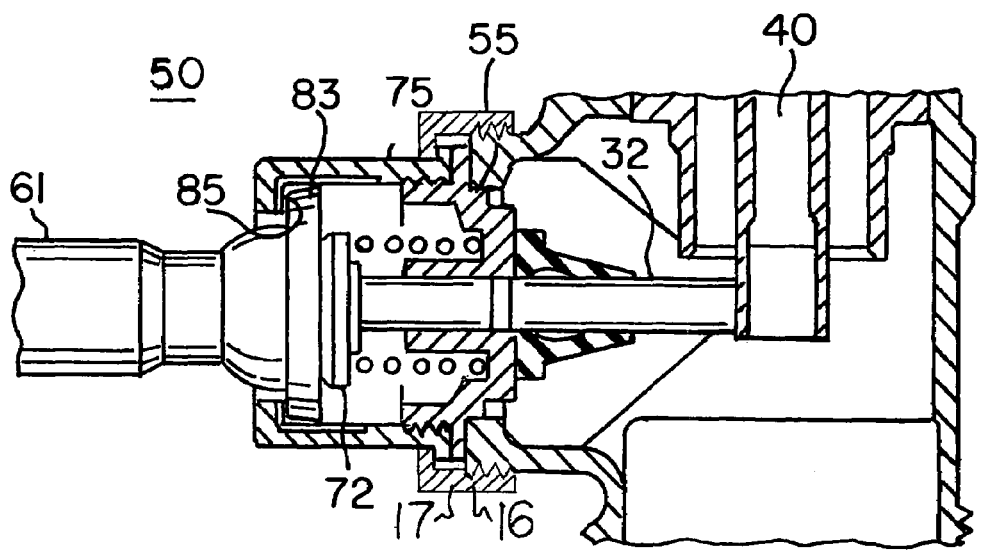
FIG. 5 is a cross-section view of the flush valve actuator illustrated in FIG. 4A in a relaxed position and mounted to a valve body.
Figure 6:
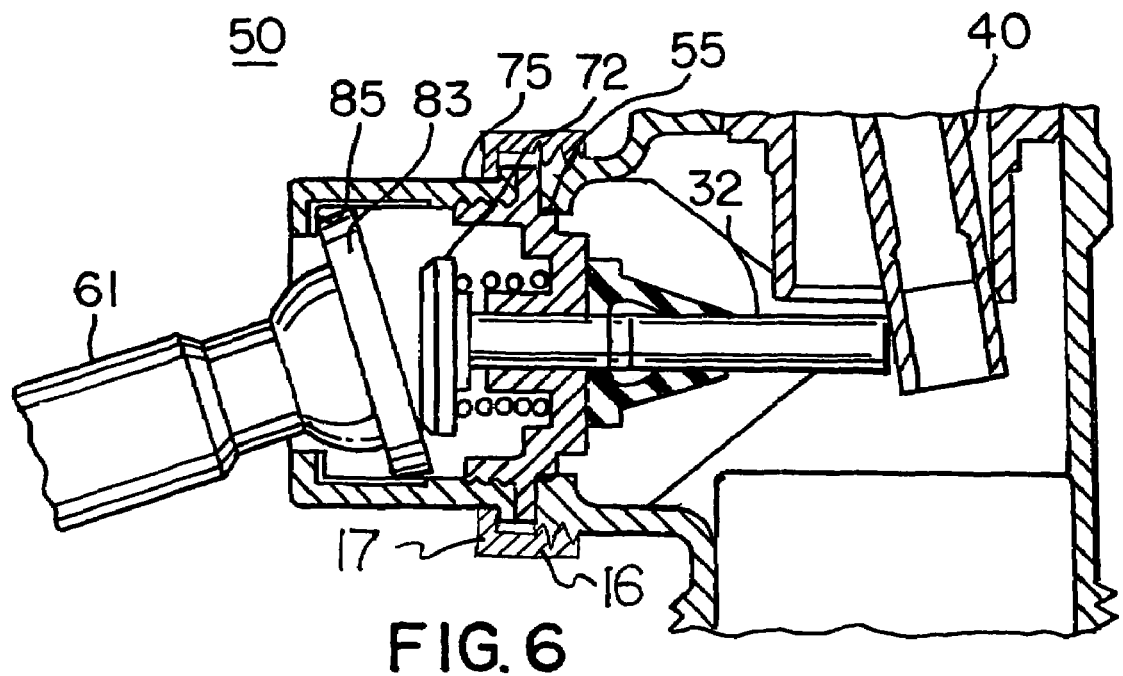
FIG. 6 is a cross-section view of the flush valve actuator illustrated in FIG. 4A in a flush position and mounted to a valve body.

FIGS. 5 and 6 illustrate the actual operation of the flush valve assembly 50 upon a relief valve post 40, for which a lower portion of the post 40 is illustrated in these figures. The flush valve handle 61 includes at one end an enlarged portion 83 that is captured by a shoulder 85 in the outer casing 75. The plunger rod head 72 is urged against the enlarged portion or face plate 83 of the handle 61. When the handle 61 is displaced, the enlarged portion 83 pivots against the shoulder 85 of the outer casing or collar 75, thereby pushing the plunger rod 32 toward the relief valve post 40. The displacement of the handle 61 is limited by the maximum travel of the plunger rod 32 since the plunger rod head 72 bottoms out against the base 55. In that respect, the maximum displacement of the relief valve post 40 is predetermined by maximum travel at the plunger rod 32. Additionally, the magnitude of the displacement of the relief valve post 40 directly affects the volume of water passing through the valve 5 during a single flush cycle. In particular, the greater the magnitude of the relief valve post 40 displacement, the greater the volume of water passing through the valve 5 during a flush cycle.

It should be appreciated that while the throw of the plunger rod 32 may be altered by moving the handle 61 a distance less than its maximum travel, the subject invention is based upon adjusting the displacement of the relief valve post 40 when the handle 61 during normal operation is extended to its maximum travel, or in the alternative, when a motor or solenoid, during normal operation, are operated to their maximum travel. By "throw" is meant the displacement or distance the plunger rod 32 travels after being moved by the drive mechanism.

When the central longitudinal axis 59 of the bore 57 within the base 55 is offset from the central longitudinal axis L of the plunger rod 32 by between 0.01 inches and 0.04 inches, for example 0.025 inches, then the vertical position of the plunger rod 32 on the relief valve post 40 may be adjusted such that, the volume of water passing through the valve body 55 during a single flush may be altered by up to a gallon. The magnitude of the displacement of the relief valve post 40 may be adjusted by positioning the plunger rod 32 so that it contacts the relief valve post 40 at different locations along the length of the post 40. The valve 5 may be tested with the plunger rod 32 positioned at different vertical locations along the relief valve post 40 to determine at a given pressure or pressures the volume of water which passes through the valve 5. It is possible to alter the contact location of the plunger 32 with the post 40 and thereby adjust the volume of water flowing through the valve 5 in a flush cycle by rotating the collar 75 a certain amount. Directing attention to FIG. 7, the notch 77 acts as external indicia to indicate the rotational position of the collar 75 and, therefore, the vertical offset of the plunger rod 32. Therefore the valve could be calibrated using the rotational position of the collar 75 as indicated by the notch 77.

Furthermore, depending upon the piping system to which the valve 5 is connected, the inlet pressure may range from 40-120 psi. Under these circumstances, the volume of water passing through the valve 5 would depend upon the inlet pressure. If high inlet pressure produced an excessive volume of water through the valve 5, then the collar 75 could be rotated to shorten the flush cycle and therefore reduce the volume of water per flush cycle. In the alternative, if low inlet pressure produced an insufficient volume of water through the valve 5, then the collar 75 could be rotated to extend the flush cycle and therefore increase the volume of water per flush cycle.

While what has so far been described is the flush actuator assembly 50, it should be appreciated that the invention may further include a flush valve which incorporates the flush actuator assembly described herein.

Furthermore, another embodiment of the subject invention is directed to a method of adjusting fluid flow for a flush valve by providing a flush valve having a plunger rod 32 with a central longitudinal axis L, wherein the plunger rod 32 may be used to displace the relief valve post 40 varying amounts to open the relief valve 28 to varying degrees, thereby permitting more or less water to flow through the valve during a flushing cycle. In particular, the step of displacing the relief valve post 40 varying amounts may be comprised of positioning the plunger rod 32 at different locations along the length of the relief valve post 40 and advancing the plunger rod 32 such that the displacement at the bottom of the relief valve post 40 will open a relief valve a lesser amount than the same displacement at a position away from the bottom of the relief valve post 40.

From the discussion so far, it should be apparent that the lateral displacement of the relief valve post 40 is a feature of the subject invention and this displacement has been varied by altering the location in which the plunger rod 32 contacts the relief valve post 40. The range of travel of the plunger rod 32 has been constant. However, it should be appreciated that another technique for displacing the relief valve post varying amounts would be to adjust the throw of the plunger rod 32 such that the maximum range of travel may be greater or lesser, thereby once again varying the displacement of the relief valve post 40. The throw of the plunger rod 32 may be altered by changing the length of the bore 57 extending to the base 55 such that the plunger rod 32 bottoms out after traveling a specified distance. The range of travel of the plunger rod 32 can range from 0.15 inches to 0.35 inches, preferably 0.2580 inches. However, there may be other mechanisms available for altering the displacement of the relief valve post 40 and it is this general concept of displacing the relief valve post by varying amounts to which one embodiment of the invention is directed.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A flush valve actuator assembly for use with a flush valve comprising:

a) a base having a bore extending there through;

b) a plunger rod having a central longitudinal axis passing there through, wherein the plunger rod is positioned within and guided by the bore of the base;

c) a drive mechanism for moving the plunger rod back and forth within the bore wherein the drive mechanism for moving the plunger rod is a movable handle mounted to the base which when moved displaces the plunger rod within the base bore;

d) visual indicia identifying a non-axisymmetric orientation of the bore relative to the central axis passing through the plunger rod, said visual indicia disposed to enable calibration of the volume of water passing through the flush valve for each flush cycle; and e) an outer casing, wherein the casing includes the indicia.

2. The flush valve actuator assembly as claimed in claim 1, wherein said handle comprises a face plate that coacts with the plunger rod.

3. The flush valve as claimed in claim 2, wherein the handle is pivotable causing the face plate to pivot and coact with the plunger rod.

4. The flush valve actuator assembly according to claim 1, further including a spring between the base and a first end of the plunger rod to bias the plunger rod in a retracted position.

5. The flush valve actuator as claimed in claim 1, wherein the bore has a bore central longitudinal axis that is offset from the central longitudinal axis passing through the plunger rod.

6. The flush valve actuator assembly as claimed in claim 1, wherein the outer casing comprises a collar.

7. A flush valve comprising:
  a) a valve body having an inlet and an outlet;
  b) a valve seat formed in the body between the inlet and outlet;
  c) a flexible diaphragm above the valve seat defining a lower chamber in fluid communication with the inlet and an upper chamber, wherein in a closed position the diaphragm is urged against and seals the valve seat and wherein in an open position the diaphragm is relaxed and spaced from the valve seat such that the inlet is in fluid communication with the outlet;
  d) a diaphragm by-pass between the upper and lower chambers, whereby fluid from the inlet passes into the upper chamber and pressurizes the upper chamber to urge the diaphragm into the closed position;
  e) a relief valve to relieve pressure from the upper chamber, thereby allowing the diaphragm to displace from the valve seat to provide fluid communication between the inlet and the outlet, wherein the relief valve is comprised of a valve seat seal and a post longitudinally extending therefrom; and
  f) a flush actuator assembly mounted upon the valve body to displace the relief valve post comprising:
    1) a base having a bore extending there through, wherein the base is secured to the valve body;
    2) a plunger rod having a central longitudinal axis, wherein the plunger rod is positioned within and guided by the bore of the base and wherein the plunger rod is positioned adjacent and transverse to the relief valve post;
    3) a drive mechanism for laterally moving the plunger rod to contact and displace the relief valve post thereby opening the relief valve, wherein the drive mechanism for moving the plunger is a movable handle mounted to the base which when moved displaces the plunger rod within the base bore;
    4) visual indicia identifying a non-axisymmetric orientation of the bore relative to the central axis passing through the plunger rod such that the base may be positioned in different angular positions upon the valve body so that the plunger rod contacts the relief valve post at different locations along the post thereby displacing the relief valve differing amounts and altering the volume of water passing through the valve for each flush cycle; and
  g) an outer casing, wherein the casing includes the indicia.

8. The flush valve according to claim 7, further including a spring between the base and a first end of the plunger rod to bias the plunger rod in a retracted position.

9. The flush valve as claimed in claim 7, wherein the outer casing comprises a collar.

10. A method of adjusting the fluid flow through a flush valve comprising:
  a) providing a flush valve comprising:
    1) a valve body having an inlet and an outlet;
    2) a valve seat formed in the body between the inlet and outlet;
    3) a flexible diaphragm above the valve seat defining a lower chamber in fluid communication with the inlet and an upper chamber, wherein in a closed position the diaphragm is urged against and seals the valve seat and wherein in an open position the diaphragm is relaxed and spaced from the valve seat such that the inlet is in fluid communication with the outlet;
    4) a diaphragm by-pass between the upper and lower chambers, whereby fluid from the inlet passes into the upper chamber and pressurizes the upper chamber to urge the diaphragm into the closed position;
    5) a relief valve to relieve pressure from the upper chamber, thereby allowing the diaphragm to displace from the valve seat to provide fluid communication between the inlet and the outlet, wherein the relief valve is comprised of a valve seat seal and a post longitudinally extending therefrom; and
    6) a flush actuator assembly mounted upon the valve body to displace the relief valve post comprising:
      i) a base having a bore extending there through, wherein the base is secured to the valve body;
      ii) a plunger rod having a central longitudinal axis passing there through, wherein the plunger rod is positioned within and guided by the bore of the base and wherein the plunger rod is positioned adjacent and transverse to the relief valve post;
      iii) a drive mechanism for laterally moving the plunger rod to contact and displace the relief valve post thereby opening the relief valve; and
      iv) visual indicia identifying a non-axisymmetric orientation of the bore relative to the central axis passing through the plunger rod such that the base may be positioned in different angular positions upon the valve body so that the plunger rod contacts the relief valve post at different locations of the post thereby displacing the relief valve differing amounts and altering the volume of water passing through the valve for each flush cycle, wherein the visual indicia is visible on an outside surface of the flush valve when assembled; and
  b) adjusting the position of where the plunger rod contacts the relief valve based upon a position of the visual indicia.

11. A method of adjusting the fluid flow through a flush valve as claimed in claim 10, wherein the adjustment of the position of where the plunger contacts the relief valve is based upon the position of the visual indicia relative to the valve body.

12. A flush valve actuator assembly for use with a flush valve comprising:
  a) a base having a bore extending there through;
  b) a plunger rod having a central longitudinal axis passing there through, wherein the plunger rod is positioned within and guided by the bore of the base;
  c) a drive mechanism for moving the plunger rod back and forth within the bore; and
  d) visual indicia identifying a non-axisymmetric orientation of the bore relative to the central axis passing through the plunger rod, said visual indicia disposed to enable calibration of the volume of water passing through the flush valve for each flush cycle, wherein the visual indicia is visible on an outside surface of the flush valve when assembled.

13. A flush valve comprising:
    a) a valve body having an inlet and an outlet;
    b) a valve seat formed in the body between the inlet and outlet;
    c) a flexible diaphragm above the valve seat defining a lower chamber in fluid communication with the inlet and an upper chamber, wherein in a closed position the diaphragm is urged against and seals the valve seat and wherein in an open position the diaphragm is relaxed and spaced from the valve seat such that the inlet is in fluid communication with the outlet;
    d) a diaphragm by-pass between the upper and lower chambers, whereby fluid from the inlet passes into the upper chamber and pressurizes the upper chamber to urge the diaphragm into the closed position;
    e) a relief valve to relieve pressure from the upper chamber, thereby allowing the diaphragm to displace from the valve seat to provide fluid communication between the inlet and the outlet, wherein the relief valve is comprised of a valve seat seal and a post longitudinally extending therefrom; and
    f) a flush actuator assembly mounted upon the valve body to displace the relief valve post comprising:
        1) a base having a bore extending there through, wherein the base is secured to the valve body;
        2) a plunger rod having a central longitudinal axis, wherein the plunger rod is positioned within and guided by the bore of the base and wherein the plunger rod is positioned adjacent and transverse to the relief valve post;
        3) a drive mechanism for laterally moving the plunger rod to contact and displace the relief valve post thereby opening the relief valve; and
        4) visual indicia identifying a non-axisymmetric orientation of the bore relative to the central axis passing through the plunger rod such that the base may be positioned in different angular positions upon the valve body so that the plunger rod contacts the relief valve post at different locations along the post thereby displacing the relief valve differing amounts and altering the volume of water passing through the valve for each flush cycle,
    wherein the visual indicia is visible on an outside surface of the flush valve when assembled.

14. A flush valve comprising:
    a) a valve body having an inlet and an outlet;
    b) a valve seat formed in the body between the inlet and outlet;
    c) a movable sealing arrangement above the valve seat defining a lower chamber in fluid communication with the inlet and an upper chamber, wherein in a closed position the movable sealing arrangement is urged against and seals the valve seat and wherein in an open position the movable sealing arrangement is spaced from the valve seat such that the inlet is in fluid communication with the outlet;
    d) a relief valve to relieve pressure, thereby allowing the movable sealing arrangement to displace from the valve seat to provide fluid communication between the inlet and the outlet, wherein the relief valve is comprised of a valve seat seal and a post longitudinally extending therefrom; and
    e) a flush actuator assembly mounted upon the valve body to displace the relief valve post comprising:
        1) a base having a bore extending there through, wherein the base is secured to the valve body;
        2) a plunger rod having a central longitudinal axis, wherein the plunger rod is positioned within and guided by the bore of the base and wherein the plunger rod is positioned adjacent and transverse to the relief valve post;
        3) a drive mechanism for laterally moving the plunger rod to contact and displace the relief valve post thereby opening the relief valve, wherein the drive mechanism for moving the plunger is a movable handle mounted to the base which when moved displaces the plunger rod within the base bore;
        4) visual indicia identifying a non-axisymmetric orientation of the bore relative to the central axis passing through the plunger rod such that the base may be positioned in different angular positions upon the valve body so that the plunger rod contacts the relief valve post at different locations along the post thereby displacing the relief valve differing amounts and altering the volume of water passing through the valve for each flush cycle; and
    g) an outer casing, wherein the casing includes the indicia.

15. A flush valve comprising:
    a) a valve body having an inlet and an outlet;
    b) a valve seat formed in the body between the inlet and outlet;
    c) a movable sealing arrangement above the valve seat defining a lower chamber in fluid communication with the inlet and an upper chamber, wherein in a closed position the movable sealing arrangement is urged against and seals the valve seat and wherein in an open position the movable sealing arrangement is spaced from the valve seat such that the inlet is in fluid communication with the outlet;
    d) a relief valve to relieve pressure, thereby allowing the movable sealing arrangement to displace from the valve seat to provide fluid communication between the inlet and the outlet, wherein the relief valve is comprised of a valve seat seal and a post longitudinally extending therefrom; and
    e) a flush actuator assembly mounted upon the valve body to displace the relief valve post comprising:
        1) a base having a bore extending there through, wherein the base is secured to the valve body;
        2) a plunger rod having a central longitudinal axis, wherein the plunger rod is positioned within and guided by the bore of the base and wherein the plunger rod is positioned adjacent and transverse to the relief valve post;
        3) a drive mechanism for laterally moving the plunger rod to contact and displace the relief valve post thereby opening the relief valve; and
        4) visual indicia identifying a non-axisymmetric orientation of the bore relative to the central axis passing through the plunger rod such that the base may be positioned in different angular positions upon the valve body so that the plunger rod contacts the relief valve post at different locations along the post thereby displacing the relief valve differing amounts and altering the volume of water passing through the valve for each flush cycle,
    wherein the visual indicia is visible on an outside surface of the flush valve when assembled.

16. A method of adjusting the fluid flow through a flush valve comprising:
  a) providing a flush valve comprising:
    1) a valve body having an inlet and an outlet;
    2) a valve seat formed in the body between the inlet and outlet;
    3) a movable sealing arrangement above the valve seat defining a lower chamber in fluid communication with the inlet and an upper chamber, wherein in a closed position the movable sealing arrangement is urged against and seals the valve seat and wherein in an open position the movable sealing arrangement is relaxed and spaced from the valve seat such that the inlet is in fluid communication with the outlet;
    4) a relief valve to relieve pressure, thereby allowing the movable sealing arrangement to displace from the valve seat to provide fluid communication between the inlet and the outlet, wherein the relief valve is comprised of a valve seat seal and a post longitudinally extending therefrom; and
    5) a flush actuator assembly mounted upon the valve body to displace the relief valve post comprising:
      i) a base having a bore extending there through, wherein the base is secured to the valve body;
      ii) a plunger rod having a central longitudinal axis passing there through, wherein the plunger rod is positioned within and guided by the bore of the base and wherein the plunger rod is positioned adjacent and transverse to the relief valve post;
      iii) a drive mechanism for laterally moving the plunger rod to contact and displace the relief valve post thereby opening the relief valve; and
      iv) visual indicia identifying a non-axisymmetric orientation of the bore relative to the central axis passing through the plunger rod such that the base may be positioned in different angular positions upon the valve body so that the plunger rod contacts the relief valve post at different locations of the post thereby displacing the relief valve differing amounts and altering the volume of water passing through the valve for each flush cycle, wherein the visual indicia is visible on an outside surface of the flush valve when assembled; and
  b) adjusting the position of where the plunger rod contacts the relief valve based upon a position of the visual indicia.

* * * * *

(12) INTER PARTES REEXAMINATION CERTIFICATE (0441st)
United States Patent
Funari

(10) Number: US 7,481,413 C1
(45) Certificate Issued: Aug. 28, 2012

(54) FLUSH ACTUATOR ASSEMBLY AND METHODS THEREFOR

(75) Inventor: Michael A. Funari, Apex, NC (US)

(73) Assignee: Z U R N Industries, LLC, Erie, PA (US)

Reexamination Request:
No. 95/001,187, May 11, 2009

Reexamination Certificate for:
Patent No.: 7,481,413
Issued: Jan. 27, 2009
Appl. No.: 11/151,692
Filed: Jun. 13, 2005

Related U.S. Application Data
(60) Provisional application No. 60/579,398, filed on Jun. 14, 2004.

(51) Int. Cl.
*F16K 31/385* (2006.01)

(52) U.S. Cl. ............... 251/40; 251/229; 251/339

(58) Field of Classification Search .............. None
See application file for complete search history.

(56) References Cited

To view the complete listing of prior art documents cited during the proceeding for Reexamination Control Number 95/001,187, please refer to the USPTO's public Patent Application Information Retrieval (PAIR) system under the Display References tab.

*Primary Examiner* — Joseph A. Kaufman

(57) ABSTRACT

A flush actuator assembly is adapted to fit existing valve bodies. The flush actuator assembly includes a plunger rod which is capable of displacing the relief valve post more or less to adjust the flow of water through the flush valve during a single flush. The relief valve post may be displaced different amounts by adjusting the actuator assembly such that the plunger rod contacts the relief valve post at different locations along the central longitudinal axis of the post. Additionally, the relief valve post may be displaced different amounts by providing a plunger rod that has a different range of travel. A method associated with displacing the relief valve post varying amounts is also disclosed.

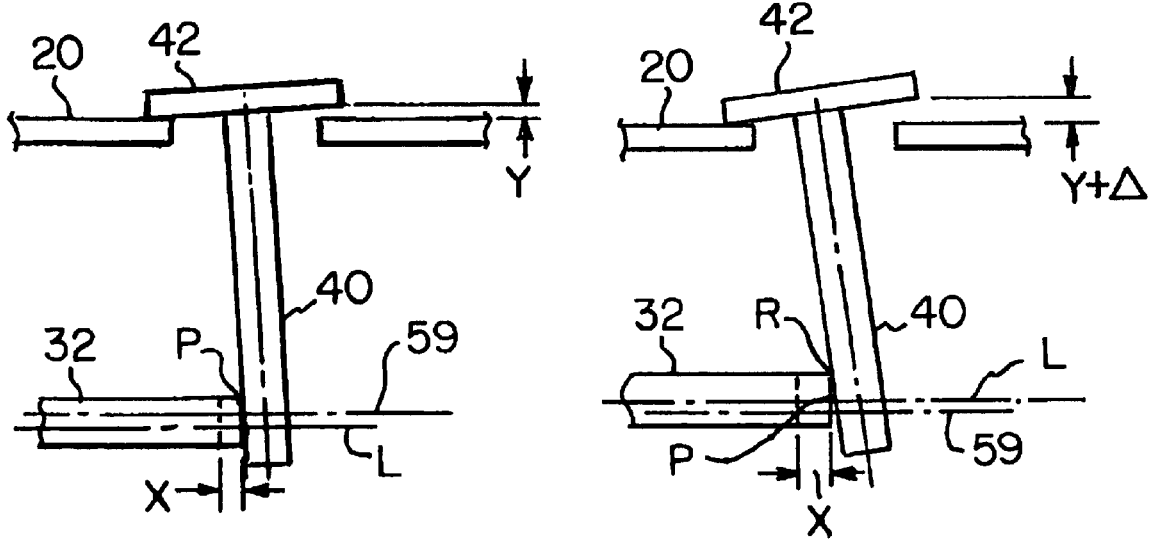

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-16 are cancelled.

* * * * *